Figure 1:
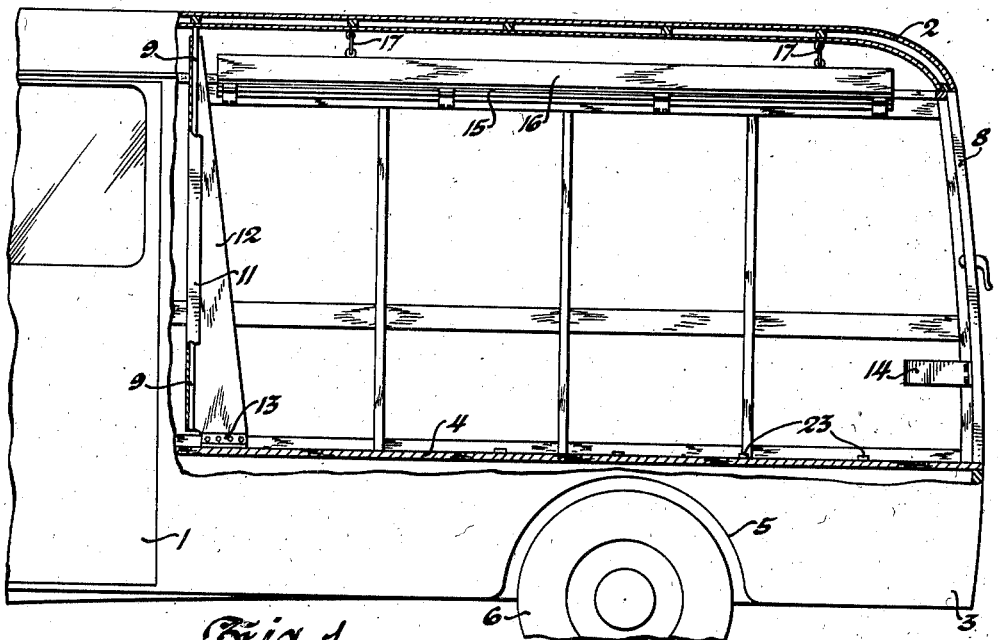

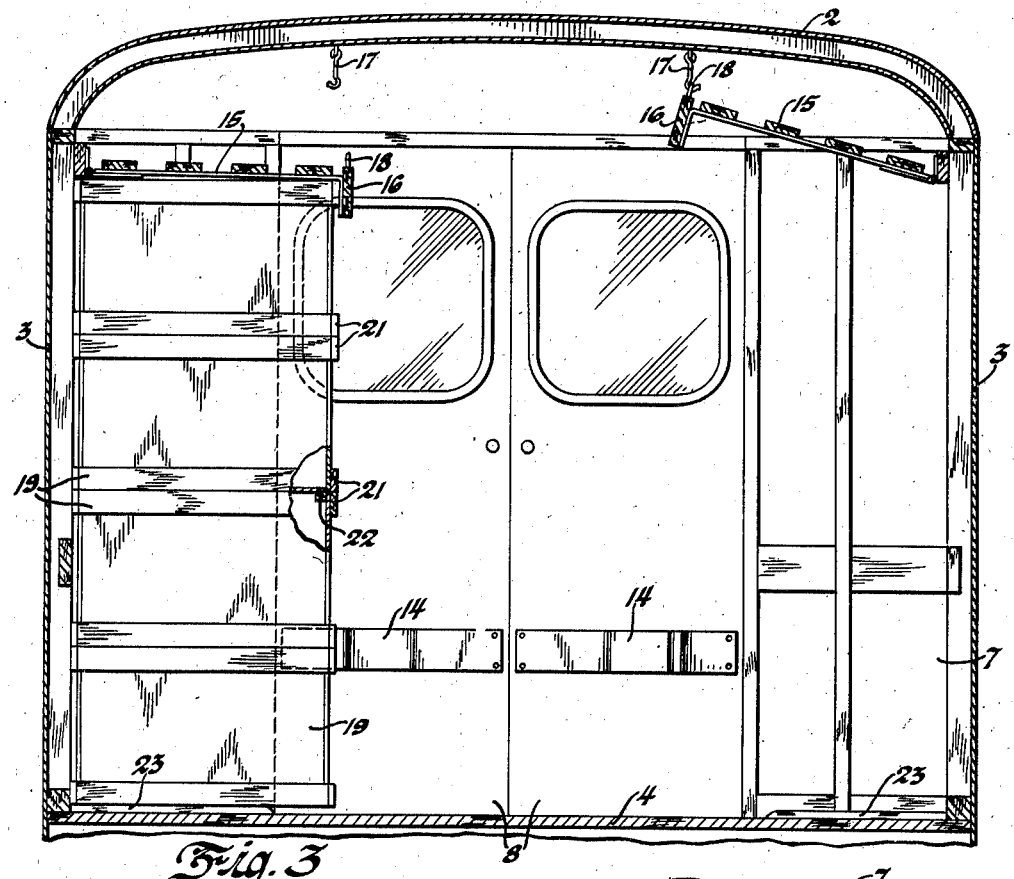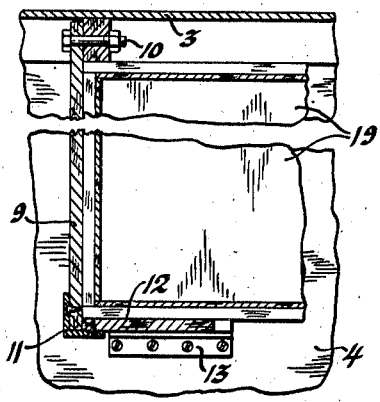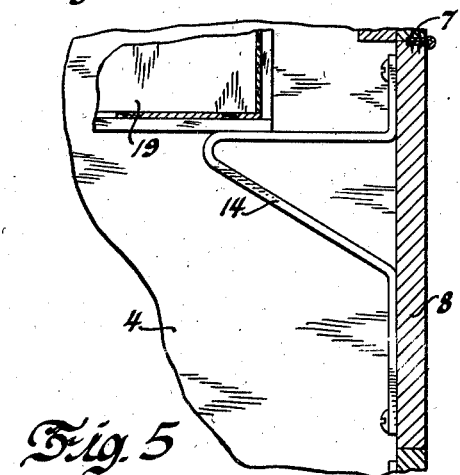

Patented Nov. 18, 1941

2,263,105

UNITED STATES PATENT OFFICE 2,263,105

DELIVERY TRUCK

Pierre Schon, Birmingham, Mich., assignor to Yellow Truck & Coach Manufacturing Company, Pontiac, Mich., a corporation of Maine Application March 30, 1940, Serial No. 326,829

12 Claims. (Cl. 296—1)

This invention relates to the handling of merchandise for delivery from door to door and while the field of use is extensive the specific disclosure herein deals with the delivery of packaged merchandise such as baked goods, meat products and any other type of merchandise delivered in small parcels of various kinds to retail stores and/or homes on a regular delivery route.

According to general practice the packaged or wrapped merchandise is placed in individual containers on the warehouse floor and the full containers are superimposed on top of one another, thereby forming a stack of loaded containers ready to be transferred from the warehouse floor to the loading platform. Generally these containers have suitable cleats on the bottom for easy sliding on the floor and for nested interfitting engagement with the tops of an under crate. When a delivery truck is to be loaded the crates are unstacked, the wrapped merchandise being carried by the armful and being placed on permanent shelves and racks built into the truck. The trucks are brought to the loading dock in succession and the empty crates are returned to the warehouse floor. The handling of packaged merchandise in this manner requires an average loading time of about forty to forty-five minutes for each truck and results in delay for succeeding trucks as well as damage to the product in the way of torn and loose wrappers, crushed packages and the like. The time element is of particular consequence if the number of trucks to be loaded greatly exceeds loading dock space.

Study of existing procedure briefly outlined above and careful consideration of the problems involved has led to the adoption of an improved system for handling articles to be delivered and which consists essentially of the provision of a specially constructed side opening container which can be filled and stacked vertically in the usual manner and then transferred in stack units from the loading platform directly into suitable loading space or stalls in the delivery truck body. The truck floor in this instance is on a single level and the removable stacks of nested containers are positioned against opposite side walls of the body with the container side openings facing a central aisle for convenient access to and withdrawal of the packages as deliveries are made.

With this arrangement the cost and excessive weight of permanent built-in racks in the truck body are eliminated, as is also all damage to the product in the transfer from the loading platform into the truck. The merchandise remains in the specially constructed containers from the time it leaves the warehouse until it reaches its destination. Delivery on the route is speeded up because the driver has quick access from the central aisle to each of the several containers. By actual timing only three minutes is required to load a truck with twenty-four containers, arranged three stacks on each side of the central aisle and since the loading time is short a large number of trucks can be taken care of at a small loading dock and begin deliveries with minimum delay and considerable savings in labor. The reduction of time spent by the driver at the loading dock gives him more time to sell on his route.

Figure 2:
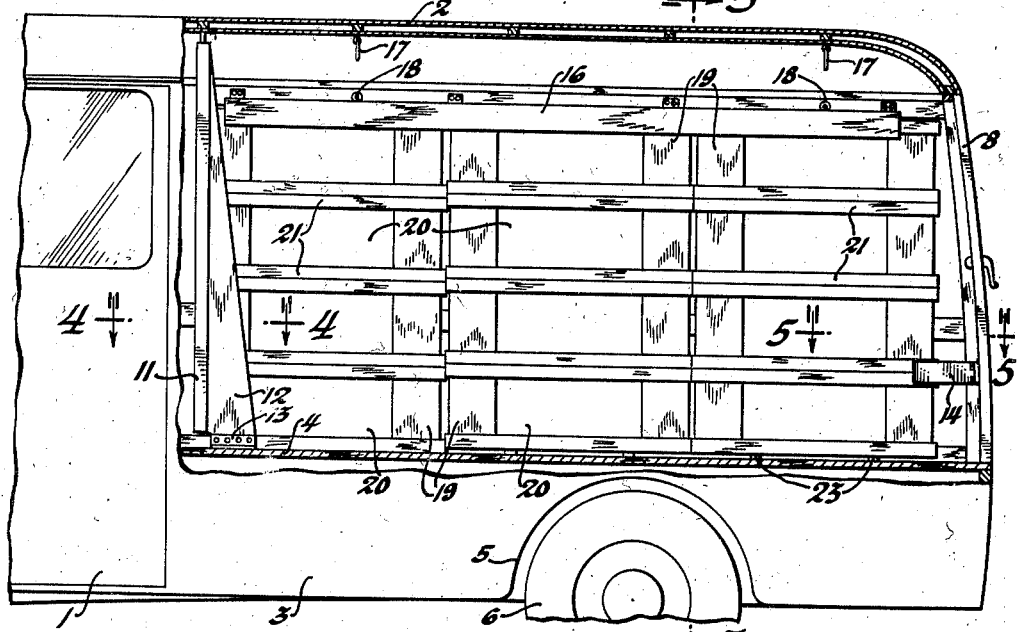

For a better understanding of the invention reference can be made to the preferred embodiment illustrated in the accompanying drawings wherein Figure 1 is a side elevation of a portion of the truck having the empty loading space shown in longitudinal vertical section; Figure 2 is a similar view showing a group of containers positioned against the far wall of the body with their side openings facing inwardly; Figure 3 is a transverse section of the truck taken as on lines 3—3 of Figure 2 and Figures 4 and 5 are detail sections on a large scale taken on lines 4—4 and 5—5, respectively, of Figure 2.

The vehicle illustrated is a specially built truck having its power plant mounted under the floor at the front end with the forward driver station located on the floor above the engine and accessible from either side through a front entrance door indicated at 1. The roof 2 of the body is supported along opposite edges by the side walls 3—3 which for appearance extend downwardly below the loading floor 4. Indented in each side wall below the level of the floor are the housings or wells 5 for the rear wheels 6. As distinguished from the usual delivery vehicle of this general type the wheel wells do not project above the floor to obstruct the loading space and the floor, therefore, extends at a single level entirely across the body from one side wall to the other for the most convenient grouping and stowing of the container stacks on the floor space.

The rear wall of the body is illustrated as including the fixed portions 7 extending inwardly from both side walls and a pair of closure doors 8 hinged on vertical axes to the fixed portion 7 for outward swinging movement. Cooperating with the fixed rear wall portions 7 in defining the longitudinal limits of the loading compartment space adjacent each side wall 3, are the transversely spaced or vertical panels 9 separating the driver station at the front from the load space and extending inwardly from the side wall to the central aisle space of the body but permitting entrance to the aisle from the forward driver station. At its outer edge each vertical panel is secured by bolts 10 to a body framing member and at its inner edge adjacent the central passage has fastened thereto by an angle strap 11 a rearwardly extending flange 12 which is fastened at its lower edge to the floor by an angle strap 13. This flange 12 cooperates with an adjacent body side wall 3 in forming a pocket to receive the front end of the foremost stack of containers and restrain inward movement thereof. To aid in restraining accidental displacement of the rearmost stack of containers, each of the loading doors 8 has mounted thereon a forwardly projecting abutment bracket 14 to engage the inner faces of the lowermost containers of the adjacent stack.

The containers in each stack are prevented from shifting relative to one another by reason of their internested relation and the stacks are retained in storage position primarily through the use of an overhead rack 15 pivotally mounted at its outer edge to the side wall 3 and releasably engaging the topmost container of each stack with a dependent rail or flange 16 at its inner edge forming an abutment or stop for the inner face of the several containers in the top row. During the loading or unloading operation the rack 15 is lifted upward and is suspended from the roof by hooks 17 engaging screw eyes 18 in the upper edge of the bar 16. The operative and inoperative positions of the parts is illustrated at the left and right, respectively, of Figure 3.

Each container 19 is of rectangular shape having a bottom, a pair of end walls and a pair of side walls, the innermost side wall being cut away throughout its central region to provide an opening 20. It also includes encircling rails or bands 21—21 at the top and bottom and a pair of transversely spaced cleats 22 on the underside of the bottom wall. These cleats facilitate sliding of the container on the floor and in addition when the containers are stacked on top of one another cause the containers to be interlocked against lateral relative shifting movement by reason of the engagement of the cleat ends and sides with the end and side walls of the container therebeneath. The top of each container is open and through its open top it is loaded with the packaged merchandise. The packages are prevented from movement through the side opening 20 by their engagement with the top and bottom rails 21. Experience has shown that the packages do not drop out of the side opening but if any trouble should develop along this line detachable retaining straps may be strung across the opening and if desired such straps may be in the nature of elastic bands.

When a truck is to be unloaded it is backed to the loading dock, the rear doors are opened and each of the retaining racks 15 is lifted and fastened by the suspension hooks 17. The rearmost stack of containers at either side is shifted laterally into the aisle and then pulled by a drag hook out of the truck and on the loading platform. To facilitate this lateral movement the floor of the truck at the rear may have a pair of skid cleats 23 fastened thereto which may be daubed with grease from time to time so that a gentle pull will dislodge the stack. The remaining stacks of containers may then be dragged out in succession. The reverse procedure is followed in loading the truck with stacks of loaded containers, the first stack of each row being introduced longitudinally into the pocket afforded by the flange 12 at the front partition 9 and additional stacks skidded in succession into location on each side of the central aisle.

In addition to its service as a load retainer the rack 15 may be used as a support for additional packages but it also serves to provide storage space for return goods picked up on the delivery route.

A convenient size load is provided using stack units of four containers each arranged in two longitudinal rows of three stacks, one on each side of the central passage, making a total of six stacks containing twenty-four containers in all. On other than peak load days and when a smaller amount of packages is to be delivered only the more easily reached containers in the upper rows need be used. The above has reference to containers and truck load space of given dimension carefully selected for ease of handling and suitability, but operating conditions may dictate the use of a greater or lesser number of containers depending upon the type of load, the size of container suitable thereto and the loading space available.

I claim:

1. In a delivery truck having a service passage, loading compartments on both sides of the passage, a series of side opening containers adapted to be preloaded, then arranged in stacks and skidded into said compartments with their side openings facing the service passage, and a pair of overhead racks movable out of the way of the containers and each having a dependent flange engageable with the inner side of the top container of an adjacent stack for retaining the containers within said compartments.

2. In the handling and door to door delivery of merchandise, a series of side opening containers comprising independent basket units adapted to be stacked on top of one another, means on each container engageable with a neighboring container to prevent lateral displacement of individual containers of a stack, a delivery truck having a loading space to receive a removable stack of containers and present their side opening accessible for selective removal of merchandise contained therein and means releasably engageable with a given container of the stack for retaining the stack in said loading space.

3. In the handling of merchandise to be delivered from door to door, a series of side opening baskets adapted to be loaded individually and stacked one on top of another in interlocking nested relation, a delivery vehicle having a floor on which a stack of nested baskets may be skidded into storage position laterally of aisle space on the floor with the basket side openings facing said aisle space, means to locate the nested baskets fore and aft in storage position and overhead structure arranged for releasable engagement with the topmost basket for retaining the removable stack of nested baskets in storage position.

4. In a delivery vehicle body having spaced side walls and a central aisle, compartments along each side wall on both sides of the aisle to receive removable storage basket containers having side openings facing the aisle for access to the interior of the container from the aisle, means to locate the containers fore and aft within the compartments and shiftable means to retain the containers laterally within said compartments and shiftable to inoperative position to enable complete removal of the containers from the vehicle body.

5. In a delivery truck having wheel wells indented in the side walls thereof, a loading floor positioned above the tops of the wheel wells and unobstructed thereby, loading stalls adjacent both side walls and on opposite sides of a central service passage, to receive removable stacks of superposed containers, each container having an opening facing said passage for access to the interior thereof from the service passage and an overhead rack pivotally mounted above each stall for retaining engagement with the stack of containers removably positioned within such stall.

6. In a delivery truck having wheel wells indented in the side walls thereof, a loading floor positioned above the tops of the wheel wells and unobstructed thereby for slidably receiving and storing adjacent each side wall a series of superposed containers, with those on one side spaced by a central passage from those on the other side and with side openings accessible from said passage, front and rear abutments extending vertically above the floor to define the longitudinal limits of container loading space and overhead retainer means shiftable into engagement with the containers to prevent lateral displacement thereof.

7. In a delivery truck for use with a series of containers arranged in superposed relation and in groups with each group of superposed containers adapted to be handled as a removable unit and to be transferred to or from storage position on either side of a central passage and with side openings in each container accessible from the central passage, a load carrying compartment including side walls, an unobstructed floor extending at one level between said walls, front partitions extending above the floor at each side wall and a rear wall having fixed portions extending inwardly of the side walls and a pair of centrally disposed hinged closure doors, each of said doors having forwardly projecting members engageable with adjacent containers to retain the same in loaded position.

8. In a delivery truck for use with removable stacks of superposed containers, a pair of side walls, a loading floor extending on one level between the side walls and on which the stacks are slidably positioned in transversely spaced relation and adjacent each side, a rear wall having fixed portions extending inwardly from the side walls and defining rearward limits of the loading space and door portions hinged to said fixed portions and provided with forwardly extending brackets to engage the inner faces of adjacent containers, and front partitions spaced ahead of the rear wall a distance substantially corresponding to the length of the containers positioned between the same and said rear wall and projected inwardly of the side walls, each of said partitions having a rearwardly extending flange cooperating with an adjacent side wall to afford a retaining pocket for the forward end of a stack of containers.

9. In a delivery truck, an unobstructed single level floor, load positioning pockets on both sides of a central service passage on said floor, and a series of removable stack units of superposed baskets containers removably positioned in said side pockets, each of said basket containers having a side opening and being adapted to be loaded individually and then stacked on top of one another for transfer as a unit into a pocket with the side openings of the several containers, all facing the central passage.

10. For the door to door delivery of merchandise, a vehicle having front, side and rear walls, the rear wall including fixed side portions and a pair of centrally disposed outwardly swinging doors, wheel wells indented in the side walls, an unobstructed floor extending between the walls on a single level above the wheel wells, a driver station behind the front wall open to a central passage leading rearwardly to said rear wall doors, vertical partitions extending inwardly from the side walls above the floor immediately behind the driver station and cooperating with the side and rear wall portions to define storage space on opposite sides of the central passage, removable stacks of containers located within the storage space, each container having a side opening accessible from the passage and being arranged to be filled individually with merchandise outside the vehicle and then interfitted with other containers in stacks of predetermined height for transfer of stack units into the vehicle and a pair of overhead parcel racks pivotally mounted at their outer edges on the side walls and releasably engageable with the uppermost containers for retaining the stacks in said storage space.

11. In the door to door delivery of merchandise, a series of side opening baskets adapted to be loaded individually with parcel merchandise to be delivered and arranged in tier assembly for handling as a unit, a parcel delivery vehicle body having a service passage and a loading space beside the passage for removable placement therein of an assembled unit of tiered baskets with their side openings all facing the service passage and enabling free access from the passage to the parcel merchandise within the several baskets.

12. In a parcel delivery vehicle body having a service passage and loading space beside the passage for removable merchandise baskets, side opening baskets adapted to be preloaded with merchandise to be delivered and removably pocketed in stacked relation within said space with the side openings facing and accessible from the service passage and means locating the stacked baskets against accidental displacement from the loading space.

PIERRE SCHON.